United States Patent
Lim (10) Patent No.: US 10,452,432 B2
(45) Date of Patent: Oct. 22, 2019

(54) METHOD AND APPARATUS FOR DISTRIBUTING TASKS OF AUTOSAR OPERATING SYSTEM

(71) Applicant: HYUNDAI AUTRON CO., LTD., Seongnam-si (KR)

(72) Inventor: Dae-Hwan Lim, Seongnam-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 279 days.

(21) Appl. No.: 15/473,507

(22) Filed: Mar. 29, 2017

(65) Prior Publication Data

US 2017/0286161 A1    Oct. 5, 2017

(30) Foreign Application Priority Data

Mar. 29, 2016 (KR) .................. 10-2016-0037473

(51) Int. Cl.
*G06F 9/48* (2006.01)
*G06F 13/16* (2006.01)
(Continued)

(52) U.S. Cl.
CPC .......... *G06F 9/4881* (2013.01); *G06F 3/0659* (2013.01); *G06F 9/48* (2013.01);
(Continued)

(58) Field of Classification Search
CPC ........ G06F 9/48; G06F 9/4806; G06F 9/4825; G06F 9/4837; G06F 9/4843; G06F 9/4881; G06F 3/0659; G06F 13/1689
See application file for complete search history.

(56) References Cited

U.S. PATENT DOCUMENTS 7,966,439 B1 * 6/2011 Treichler ............ G06F 13/1689
710/306
2011/0145651 A1 * 6/2011 Molnar ................ G06F 11/3612
714/38.1
(Continued)

FOREIGN PATENT DOCUMENTS

JP       2001-337841 A    7/2001
KR   1020100060312 A   10/2011
KR   1020130050571 A    7/2013

OTHER PUBLICATIONS

Anssi et al, "AUTOSAR vs. MARTE for Enabling Timing Analysis of Automotive Applications", Ober and I. Ober (Eds.): SDL 2011, LNCS 7083, pp. 262-275, 2011.*

(Continued)

*Primary Examiner* — Charles M Swift
(74) *Attorney, Agent, or Firm* — Baker & Hostelter LLP; Hyunho Park (57) ABSTRACT

Provided are a method of distributing tasks of an AUTomotive Open System Architecture (AUTOSAR) operating system and managing OsTask using OsAlarm in the AUTOSAR operating system, the method comprises, storing in Counter_BSW a value of a counter at a time when a function for setting an alarm for a basic software (BSW) module is called, storing in Counter_RTE the value of the counter at a time when a function for setting an alarm for an application software (ASW) module is called and correcting an offset value of the alarm for the ASW module using a value of Counter_BSW and a value of Counter_RTE.

8 Claims, 11 Drawing Sheets

(51) Int. Cl.
- *G06F 3/06* (2006.01)
- *H04L 12/407* (2006.01)
- *H04J 3/06* (2006.01)
- *H04L 12/40* (2006.01)

(52) U.S. Cl.
CPC .......... *G06F 9/4806* (2013.01); *G06F 9/4825* (2013.01); *G06F 9/4837* (2013.01); *G06F 13/1689* (2013.01); *H04J 3/06* (2013.01); *H04L 12/40* (2013.01); *H04L 12/407* (2013.01); *H04L 2012/40273* (2013.01)

(56) References Cited

U.S. PATENT DOCUMENTS

| | | | |
|---|---|---|---|
| 2013/0159577 A1* | 6/2013 | Fujii | G06F 13/24 710/262 |
| 2013/0290649 A1* | 10/2013 | Jorgensen | H03K 21/38 711/154 |
| 2014/0149612 A1* | 5/2014 | Suzuki | G06F 13/24 710/48 |
| 2018/0012631 A1* | 1/2018 | Moller | G11B 27/10 |

OTHER PUBLICATIONS

Scheickl et al, "How Timing Interfaces in AUTOSAR can Improve Distributed Development of Real-Time Software", 2008, pp. 1-6 plus cover.*

Madhumita, "Tool-Supported Timing Analysis of Automotive Embedded Systems", Department of Applied Information Technology Chalmers University of Technology, Gothenburg, Sweden, 2009, pp. 1-73.*

Scheduling Design and Simulation of Software Components for EPS System based on AUTOSAR, Gwangmin Park,et al., Journal of Institute of Control, Robotics and Systems 16(6), 2010.6, 539-545.

* cited by examiner

| MODULE | Counter VALUE | Offset VALUE | EXECUTION TIME | EXECUTION TIME |
|---|---|---|---|---|
| BSW | 0x1000 | 0x7000 | n Cycle + 0x8000 | 8ms, 24ms, 39ms,... |
|  |  | 0xA000 | n Cycle + 0xB000 | 10ms, 26ms, 42ms,... |
| ASW | 1 Cycle + 0x6000 | 0x1000 | 1 Cycle + 0x7000 | 33ms |
|  |  | 0x2000 | 1 Cycle + 0x8000 | 24ms |

COINCIDENCE

| MODULE | Counter VALUE | Offset VALUE | CORRECTED OFFSET VALUE | EXECUTION TIME | EXECUTION TIME |
|---|---|---|---|---|---|
| BSW | 0x1000 | 0x7000 | | n Cycle + 0x8000 | 8ms, 24ms, 40ms,... |
| | | 0xA000 | | n Cycle + 0xB000 | 11ms, 27ms, 43ms,... |
| ASW | 1 Cycle + 0x6000 | 0x1000 | 0xC000 | 2 Cycle + 0x2000 | 34ms |
| | | 0x2000 | 0xD000 | 2 Cycle + 0x3000 | 35ms |

FIG. 9

METHOD AND APPARATUS FOR DISTRIBUTING TASKS OF AUTOSAR OPERATING SYSTEM

This application claims the benefit of Korean Patent Application No. 10-2016-0037473, filed on Mar. 29, 2016, in the Korean Intellectual Property Office, the disclosure of which is incorporated herein by reference in its entirety.

BACKGROUND

1. Field

The present inventive concept relates to a method and apparatus for distributing tasks of an AUTomotive Open System Architecture (AUTOSAR) operating system, and more particularly, to a method of distributing tasks by generating an alarm with reference to a counter and, at the same time, adjusting an offset of the alarm, and an apparatus for performing the method.

2. Description of the Related Art

Conventional automobiles are a collection of mechanical devices, but recent automobiles can be said to be a collection of various electronic devices. As intelligent services such as automatic balancing control and autonomous parking become popular, more and more electronic devices are interconnected and interlocked and embedded in automobiles. Therefore, this is the era of booting a car, not starting the car.

As the number of electronic devices used in an automobile increases, the need for standardization of software used in the automobile also increases. To increase the reusability of modules and improve the compatibility of parts of each vehicle, an embedded software open platform based on AUTomotive Open System Architecture (AUTOSAR) is being developed.

AUTOSAR refers to an open and standardized automotive software architecture. AUTOSAR is the name of a standard and an organization that was established principally by automobile manufacturers, parts suppliers and IT companies in order to standardize electronic devices used in an automobile. More information about AUTOSAR can be found on AUTOSAR's homepage (http://www.autosar.org/).

While AUTOSAR will revolutionize the automotive industry, the Object Management Group (OMG) which led model-based development and OSEK/VDX which pursued the standardization of embedded systems for electrical and electronic devices in the European automotive industry are behind AUTOSAR. The components of the OSEK standard include OSEK OS, OSEK COM, OSEK NM, OSEK OIL, OSEK RTI, Binding Document, OSEKtime, and OSEK FTCom.

Among them, OSEK OS is a basic operating system that supports preemptive multi-tasking and provides a standardized interface to application programs. The standardized interface enables hardware-independent application development and enhances scalability and stability. In addition, scheduling enables various tasks to be performed in a distributed manner by one electronic control unit (ECU), thereby maximizing utilization of hardware resources.

AUTOSAR's operating system provides OsAlarm and related OsTask to allow software to be implemented based on periodic scheduling. Basically, an alarm initialization time for OsTask provided by AUTOSAR may be divided into an initialization time for a basic software (BSW) module and an initialization time for an application software (ASW) module.

However, since the initialization times of the BSW module and the ASW module are different, resources cannot be efficiently distributed. In other words, since OsAlarm is initialized and started at different times for the BSW module and the ASW module, it is difficult to accurately predict times when tasks will be executed and to efficiently distribute the tasks. In this regard, a task management method capable of efficiently distributing resources is required.

SUMMARY

Aspects of the inventive concept provide a method and apparatus for distributing tasks of an AUTomotive Open System Architecture (AUTOSAR) operating system.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a method of distributing tasks of an AUTomotive Open System Architecture (AUTOSAR) operating system and managing OsTask using OsAlarm in the AUTOSAR operating system, the method comprises storing in Counter_BSW a value of a counter at a time when a function for setting an alarm for a basic software (BSW) module is called, storing in Counter_RTE the value of the counter at a time when a function for setting an alarm for an application software (ASW) module is called and correcting an offset value of the alarm for the ASW module using a value of Counter_BSW and a value of Counter_RTE.

In one embodiment, the function for setting the alarm for the BSW module is a SchM_Init function, the function for setting the alarm for the ASW module is an Rte_Start function, and the SchM_Init function is executed before the Rte_Start function.

In another embodiment, the correcting of the offset value comprises, comparing the value of Counter_RTE with a value of (Counter_BSW+Offset) and setting a new offset when the value of Counter_RTE is greater than the value of (Counter_BSW+Offset), wherein the new offset is set by new Offset=(Cycle−((Counter_RTE−(Counter_BSW+Offset)) % Cycle)), where Cycle is a cycle of the counter.

In another embodiment, the correcting of the offset value comprises, comparing the value of Counter_RTE with a value of (Counter_BSW+Offset) and setting a new offset when the value of Counter_RTE is smaller than the value of (Counter_BSW+Offset), wherein the new offset is set by new Offset=(Cycle−(((Counter_BSW+Offset)−Counter_RTE) % Cycle)), where Cycle is a cycle of the counter.

According to another aspect of the inventive concept, there is provided an apparatus for distributing tasks of an AUTOSAR operating system and managing OsTask using OsAlarm in the AUTOSAR operating system, the apparatus comprises a Counter_BSW storage unit which stores in Counter_BSW a value of a counter at a time when a function for setting an alarm for a BSW module is called, a Counter_RTE storage unit which stores in Counter_RTE the value of the counter at a time when a function for setting an alarm for an ASW module is called and an Offset correction unit which corrects an offset value of the alarm for the ASW module using a value of Counter_BSW and a value of Counter_RTE.

According to another aspect of the inventive concept, there is provided a method of correcting an alarm offset when setting two or more alarms using one counter in an embedded operating system, the method comprises storing a value of a first counter at a time when a function for setting a first alarm using a relative method is called, storing a value of a second counter at a time when a function for setting a second alarm using the relative method is called and correcting an offset value of the second alarm using the value of the first counter and the value of the second counter.

In one embodiment, the correcting of the offset value of the second alarm comprises comparing the value of the second counter with (the value of the first counter+the offset value) and setting a new offset when the value of the second counter is greater than (the value of the first counter+the offset value), wherein the new offset is set by new offset=(counter cycle−(value of the second counter−(value of the first counter)+offset value)) % counter cycle)).

In another embodiment, the correcting of the offset value of the second alarm comprises, comparing the value of the second counter with (the value of the first counter+the offset value) and setting a new offset when the value of the second counter is smaller than (the value of the first counter+the offset value), wherein the new offset is set by new offset=(counter cycle−(((value of the first counter+offset value)−value of the second counter) % counter cycle)).

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments of the inventive concept will be described in greater detail with reference to the attached drawings. Advantages and features of the present inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like reference numerals refer to like elements throughout the specification.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting of the inventive concept. As used herein, the singular forms "a", "an" and "the" are intended to include the plural forms as well, unless the context clearly indicates otherwise.

It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Hereinafter, the inventive concept will be described in more detail with reference to the accompanying drawings.

Figure 1:
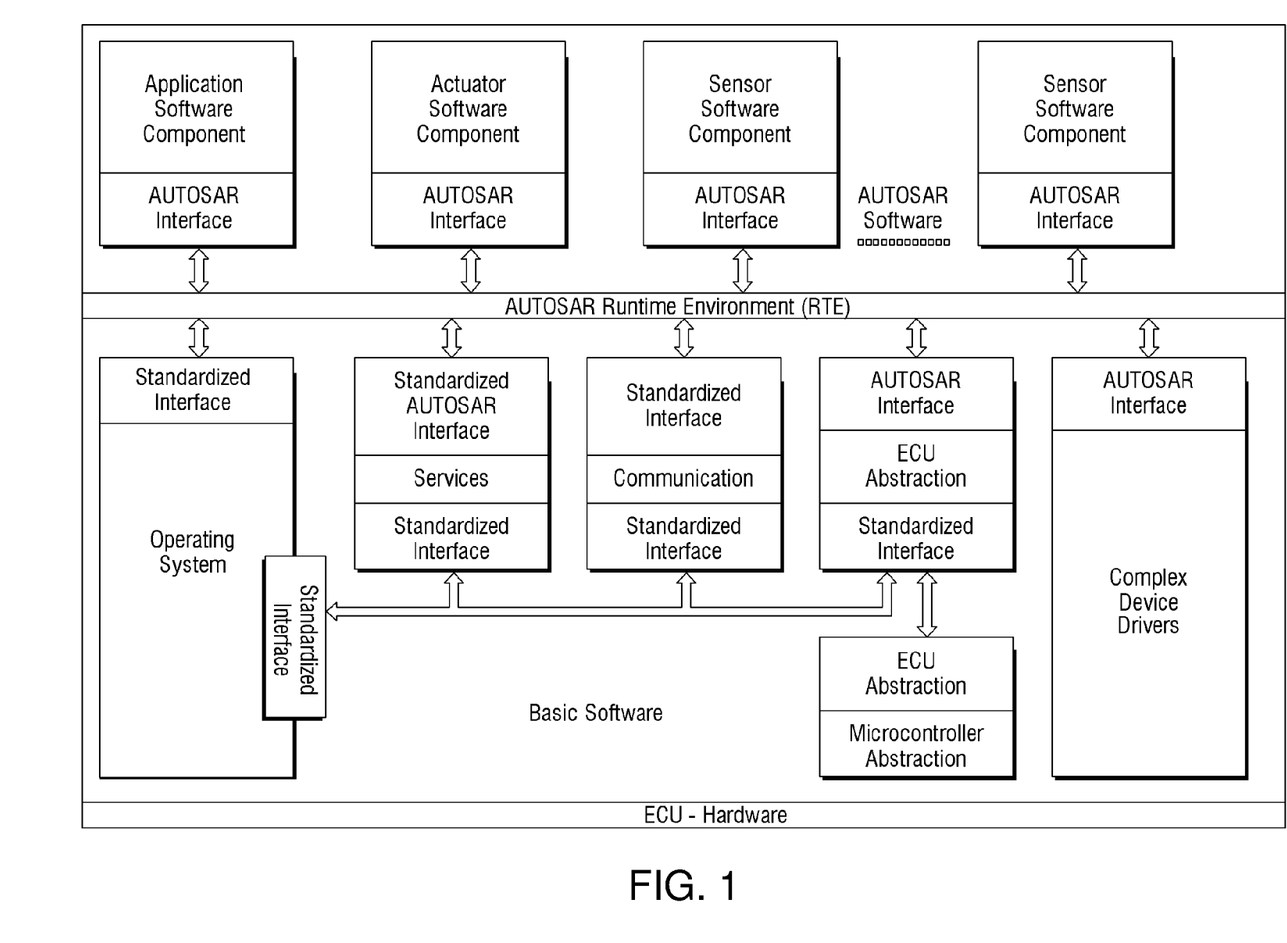
FIG. 1 illustrates the configuration of AUTomotive Open System Architecture (AUTOSAR) used in an embodiment.

FIG. 1 illustrates the configuration of AUTomotive Open System Architecture (AUTOSAR) used in an embodiment.

Referring to FIG. 1, AUTOSAR's software largely consists of three layers: Software Component (SWC), Runtime Environment (RTE), and Basic Software (BSW). InAUTOSAR's standard platform, a number of components basically have input/output ports and virtually communicate with each other through component-based software development (CBD).

The SWC is located at the top, performs engine, automatic transmission and brake control functions, and is placed in a virtual network called 'virtual functional bus (VFB)' to be linked to an electronic control unit (ECU). The RTE is located between the SWC and the BSW and provides an interface for data exchange between the SWC and the BSW. The RTE enables the SWC to be hardware-independent and establishes a communication connection between modules. The BSW is located at the lowest layer and provides services, such as operating system, device drivers and communication, needed for the SWC to perform necessary tasks.

Basically, the AUTOSAR operating system executes OsTask through OsAlarm. OsAlarm has an initialization time for each of a BSW module and an application software (ASW) module. That is, the BSW module is initialized by a SchM_Init( ) function at the BSW layer, and the ASW module is initialized by an Rte_Start( ) function at the RTE layer.

Although the BSW module and the ASW module are initialized and started at different times, an absolute method or a relative method has been used for OsAlarm. Problems of the absolute method or the relative method due to different initialization and start times will be described in detail later with reference to FIGS. 7A and 7B. Prior to that, the absolute method and the relative method will be described in detail with reference to FIGS. 2 and 3.

Figure 2:
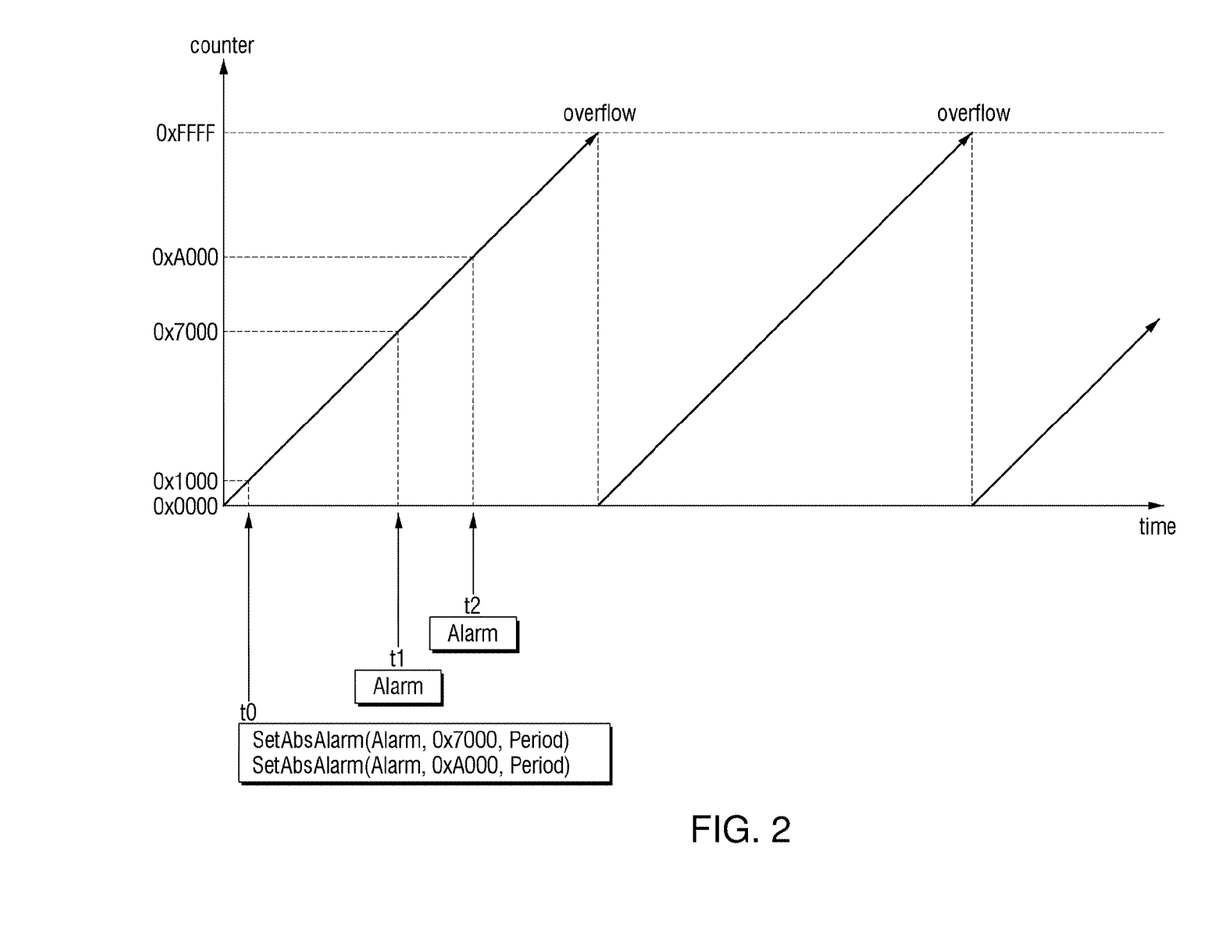
FIGS. 2 and 3 are diagrams for explaining an absolute method and a relative method used in an embodiment.
Figure 3:
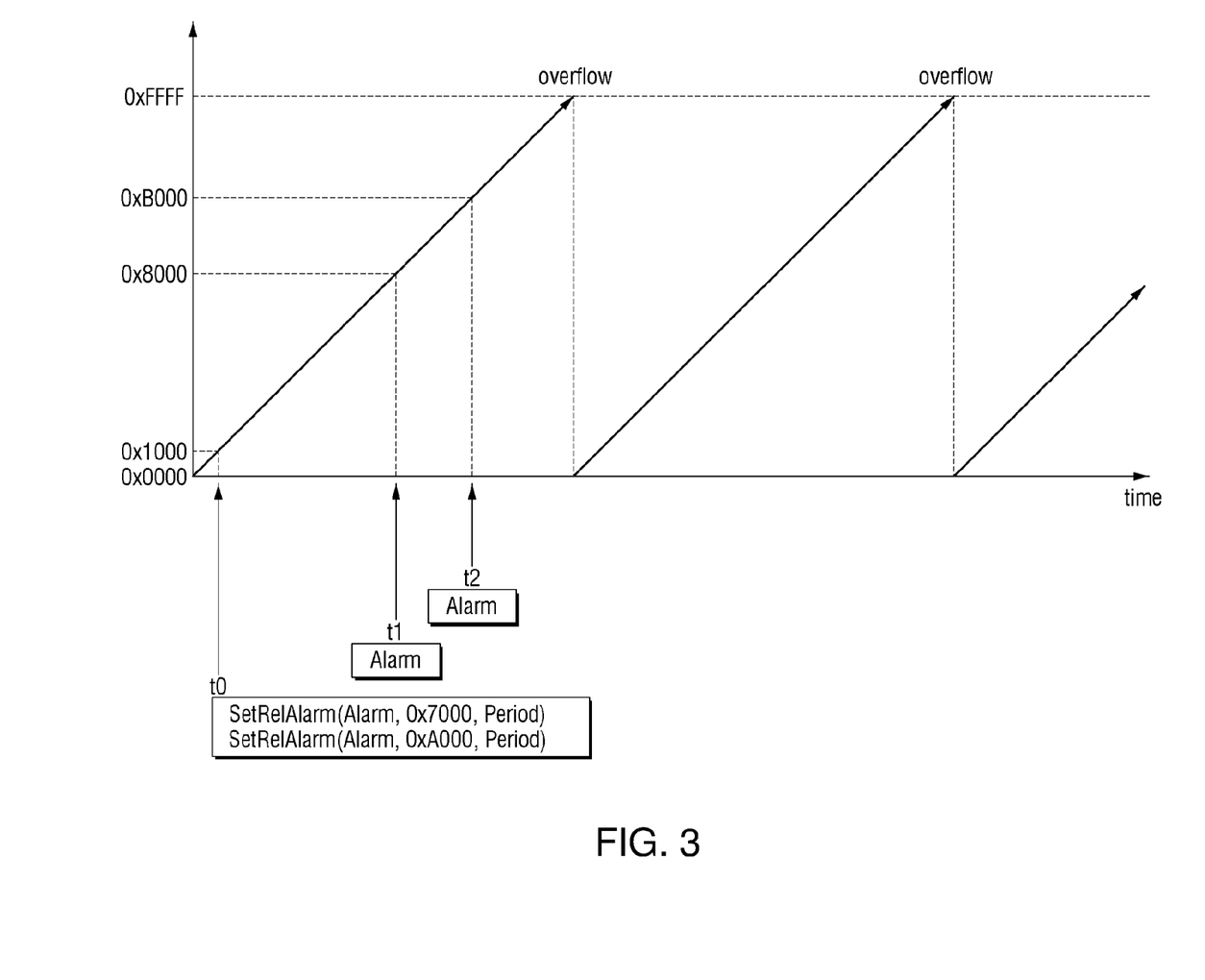

FIGS. 2 and 3 are diagrams for explaining the absolute method and the relative method used in an embodiment. FIG. 2 is a diagram for explaining the absolute method, and FIG. 3 is a diagram for explaining the relative method.

Before FIGS. 2 and 3 are described, a coordinate plane used in FIGS. 2 and 3 will be described. In FIG. 2, the horizontal axis represents the time that elapses after an operating system is started, and the vertical axis represents a counter, that is, an up counter having a value that increases every hour for the execution of a task in the operating system. The up counter may have a value from 0x0000 to 0xFFFF. After the up counter has a value of 0xFFFF, the value cannot be increased anymore. Therefore, an overflow occurs. That is, after 0xFFFF, the value of the counter is counted from 0x0000 again.

For ease of understanding, it will be assumed that it takes 16 ms for the value of the counter to increase from 0x0000 to 0xFFFF. That is, in the example of FIG. 2 or 3, after the AUTOSAR operating system is started, a first cycle of the counter runs for a period of 0 to 16 ms, and a second cycle of the counter runs for a period of 16 to 32 ms. Similarly, a third cycle of the counter runs for a period of 32 to 48 ms.

While the cycle of the counter is being repeated at regular intervals, if a task is executed every time the counter has a specific value, it can be executed at regular intervals. That is, the AUTOSAR operating system may generate an alarm to execute a task whenever the counter has a specific value. The value of the counter at which an alarm will be generated may be designated in two ways.

A first way is an absolute method. The absolute method, as its name indicates, is a method of designating the value of the counter at which an alarm will be generated. In the example of FIG. 2, as the alarm is initialized when the counter has a value of 0x1000, that is, at a time t0 of 1 ms, two alarms are set according to the absolute method. Here, absolute alarms may be set using a function called 'SetAbsAlarm.'

The SetAbsAlarm function receives a total of three parameters. The SetAbsAlarm function receives an identifier of an alarm as a first parameter, an offset value as a second parameter, and a period as a third parameter.

Here, the offset value received is a specific value of the counter at which an alarm will be generated. In the example of FIG. 2, since 0x7000 and 0xA000 are received as offset values, one alarm is generated at a time t1 of 7 ms, and the other alarm is generated at a time t2 of 10 ms. That is, in the absolute method, an alarm is generated when an offset value received is equal to the value of the counter, regardless of the value of the counter at a time when the SetAbsAlarm function is called.

In addition, an alarm can be repeated at regular intervals according to the value of the period which is the third parameter. That is, SetAbsAlarm (Alarm, 0x7000, Period) can be repeatedly executed in the form of n Cycle+0x7000. Since one cycle of 0xFFFF is 16 ms as assumed above, SetAbsAlarm (Alarm, 0x7000, Period) may be determined to have a period of n*16 ms+7 ms, and SetAbsAlarm (Alarm, 0xA000, Period) may be determined to have a period of n*16 ms+10 ms. For example, when n=0, an alarm may be generated at t1 of 7 ms and at t2 of 10 ms. Although not illustrated in FIG. 2, when n=1, an alarm may be generated at 23 ms and 26 ms.

In the absolute method, the time when an alarm will be generated is determined by an offset value as will be described in more detail later with reference to FIGS. 4A and 4B. Therefore, if offset values are different, an alarm is automatically generated at different times within one period, and tasks are executed accordingly. That is, it is possible to increase the utilization of resources by distributing tasks such that the tasks are executed at different times.

A second way to designate the value of the counter at which an alarm will be generated is the relative method. As its name indicates, the relative method relatively determines the specific value of the counter at which an alarm will be generated based on the value of the counter at a time when a function is called. In the example of FIG. 3, as the alarm is initialized when the counter has a value of 0x1000, that is, at a time t0 of 1 ms, two alarms are set according to the relative method. Here, relative alarms may be set using a function called 'SetRelAlarm.'

The SetRelAlarm function, like the SetAbsAlarm function, receives three parameters. In the example of FIG. 3, two alarms corresponding to offset values of 0x7000 and 0xA000 are set as in FIG. 2. While the same offset values as those for the SetAbsAlarm function of FIG. 2 are received, alarms are generated at different times from those of FIG. 2 because the SetRelAlarm function of FIG. 3 also considers the value of the counter at a time when the current SetRelAlarm function is called. That is, an alarm is generated at a time corresponding to 0x8000, i.e., at a time t1 of 8 ms obtained by adding a time of 7 ms corresponding to 0x7000 to a time t0 of 1 ms when the current SetRelAlarm function was called, and another alarm is generated at a time corresponding to 0xB000, i.e., at a time t2 of 11 ms obtained by adding a time of 10 ms corresponding to 0xA000 to the time t0 of 1 ms.

Although the same values of 0x7000 and 0xA000 are received as offset parameters, an alarm is generated at 7 ms and 10 ms in the SetAbsAlarm function of FIG. 2 but at 8 ms and 11 ms in the SetRelAlarm function of FIG. 3. This is because the SetRelAlarm function also takes into account the time when the SetRelAlarm function is called. That is, 1 ms of the time t0 is reflected in the calculation of the times t1 and t2 when an alarm will be generated.

In the relative method, it is not possible to know when an alarm will be generated by using only an offset. That is, since the time when a function is called should also be taken into account in the relative method, it is difficult to distribute times when tasks will be executed using offsets alone. However, since the time when an alarm will be generated is determined based on the time when a function is called, the time when the alarm will be generated can be accurately predicted.

Figure 4A:
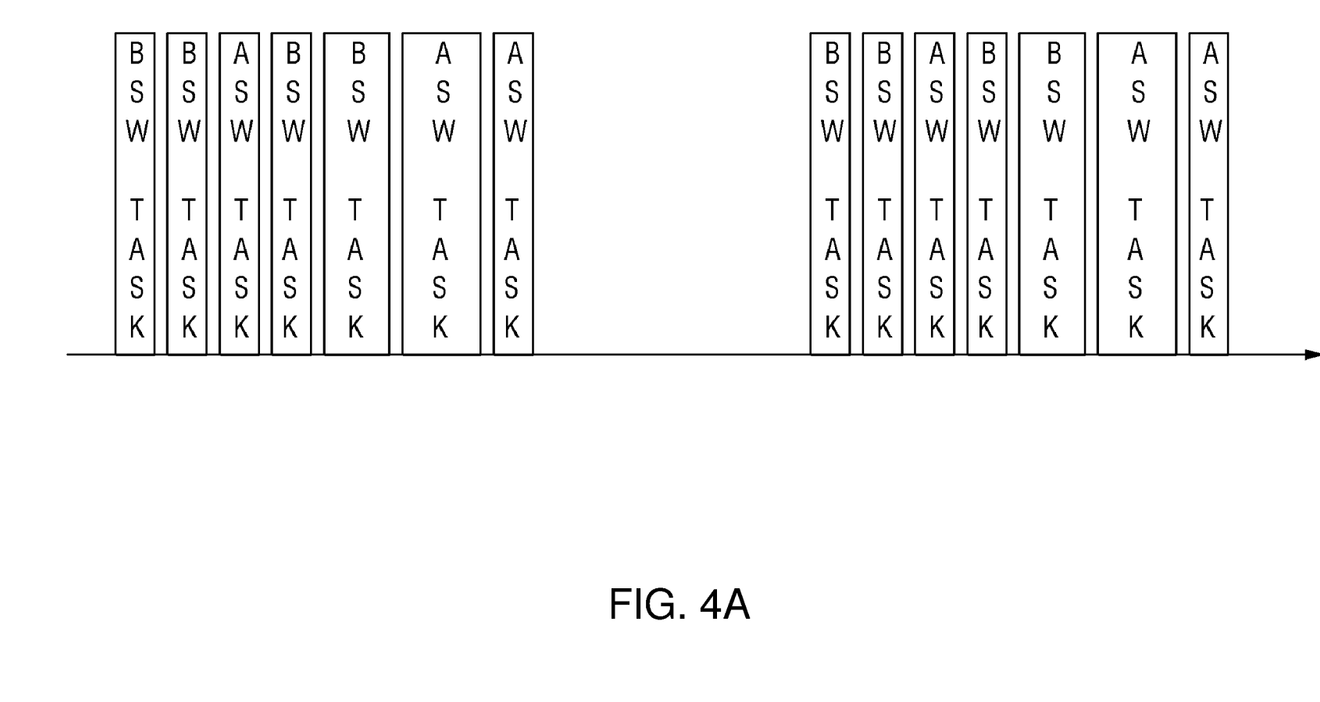
FIGS. 4A and 4B are diagrams for explaining task distribution used in an embodiment.
Figure 4B:
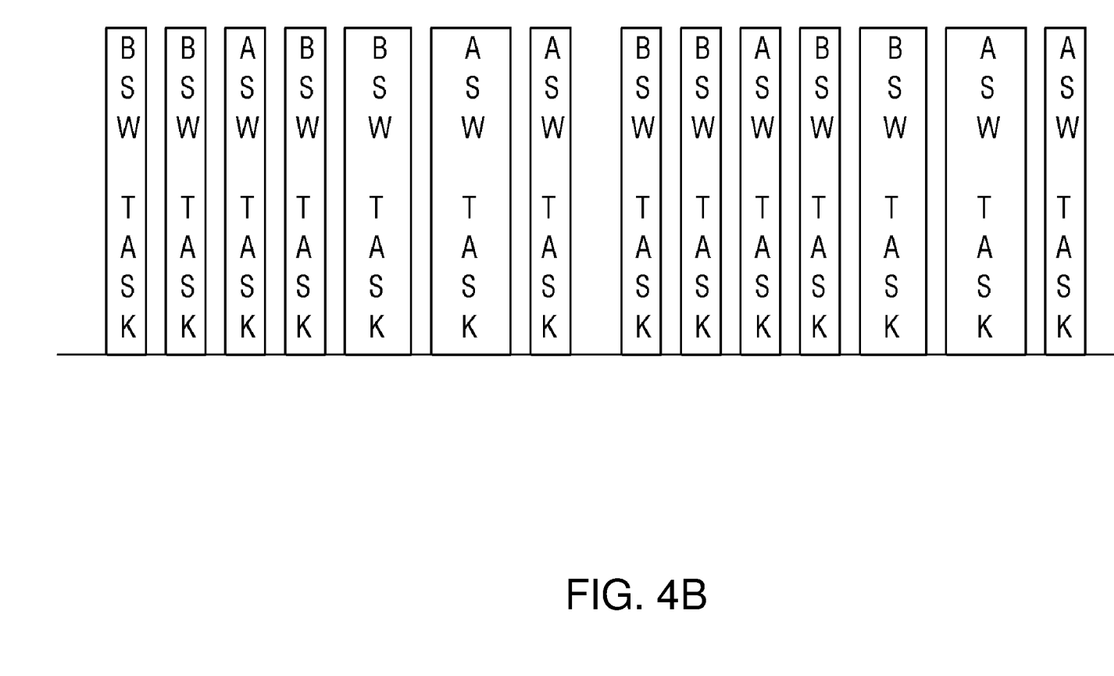

FIGS. 4A and 4B are diagrams for explaining task distribution used in an embodiment.

In the AUTOSAR operating system, a task is executed when an alarm is generated. The alarm is divided into an alarm for the BSW module and an alarm for the ASW module. The alarm for the BSW module is set by calling a SchM_Init( ) function, and the alarm for the ASW module is set by calling an Rte_Start( ) function.

In the AUTOSAR operating system, an alarm initialized and started at the times of SchM_Init and Rte_Start causes related OsTask to be executed periodically in each cycle of the alarm after a set offset. Here, since a plurality of OsAlarm cause related OsTask to be executed according to their respective cycles, if OsAlarm is set such that a plurality of OsTask are executed successively at a specific time, accurate cycle-based OsTask execution cannot be guaranteed.

Referring to FIG. 4A, a task of each module is performed as time passes. In particular, BSW TASK is performed by the BSW module, and ASW TASK is performed by the ASW module. Here, if alarms are concentrated in a specific time section, tasks are also concentrated. As a result, resources used to execute the tasks are also concentrated in this time section. This may lead to degradation of performance, which may reduce the safety of a vehicle.

Therefore, tasks concentrated in a specific time section as illustrated in FIG. 4A should be distributed as illustrated in FIG. 4B. To this end, it is required to distribute task execution times. Here, the time required to execute a task should be taken into consideration. However, assuming that the time required to execute a task is very short, it is possible to distribute tasks by simply distributing task execution times, thereby efficiently utilizing resources.

To distribute task execution times, the offset parameter of the SetAbsAlarm function or the SetRelAlarm function should be appropriately used as described above. In the SetAbsAlarm function, the time when an alarm is generated is determined by an offset value. In the SetRelAlarm function, the time when an alarm is generated is determined by an offset value and a counter value at a time when the SetRelAlarm function is executed. Problems that arise when tasks are distributed using each of the above functions will now be described.

Figure 5:
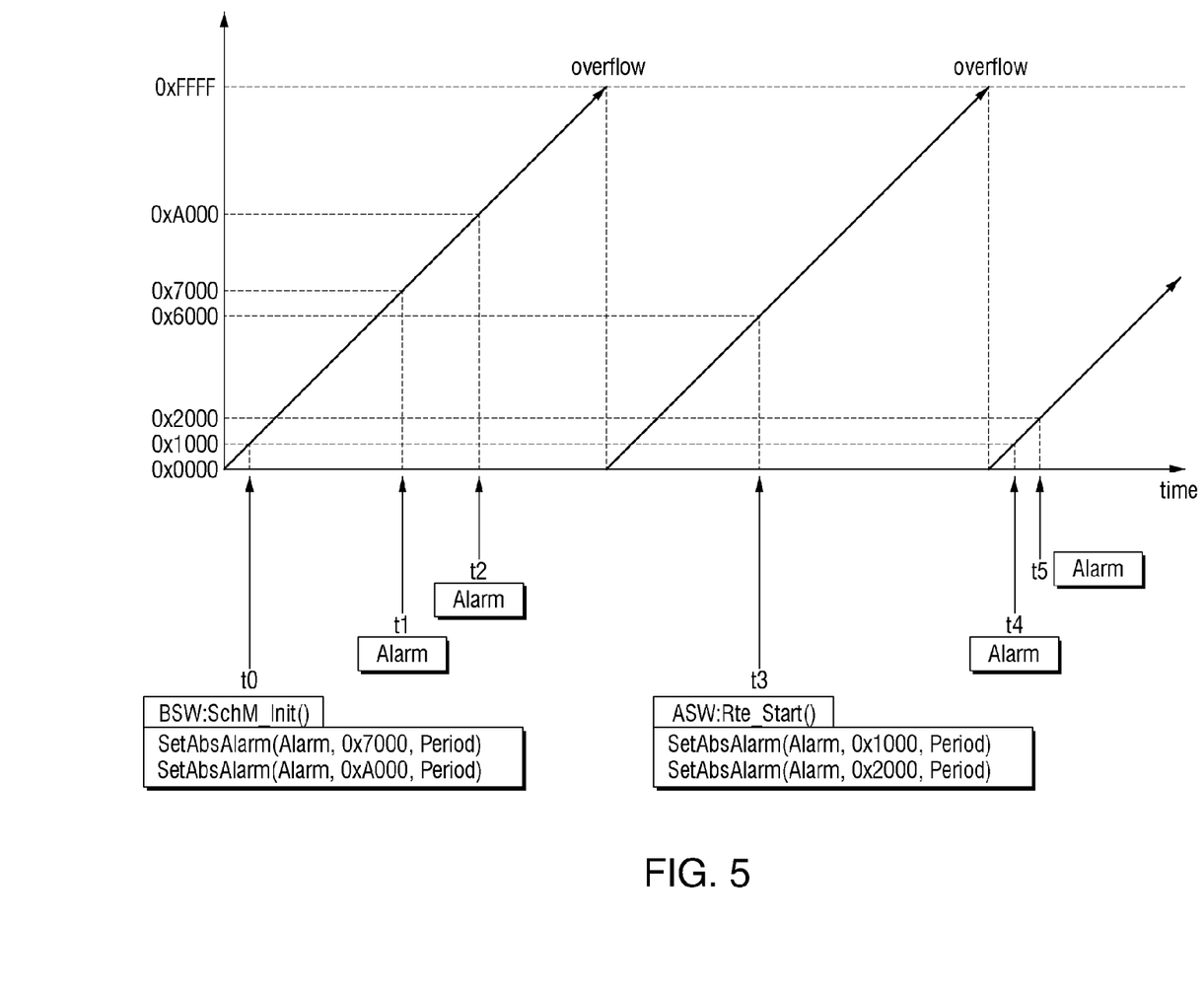
FIGS. 5 and 6 are diagrams for explaining problems of task distribution by the conventional absolute method and the conventional relative method.
Figure 6:
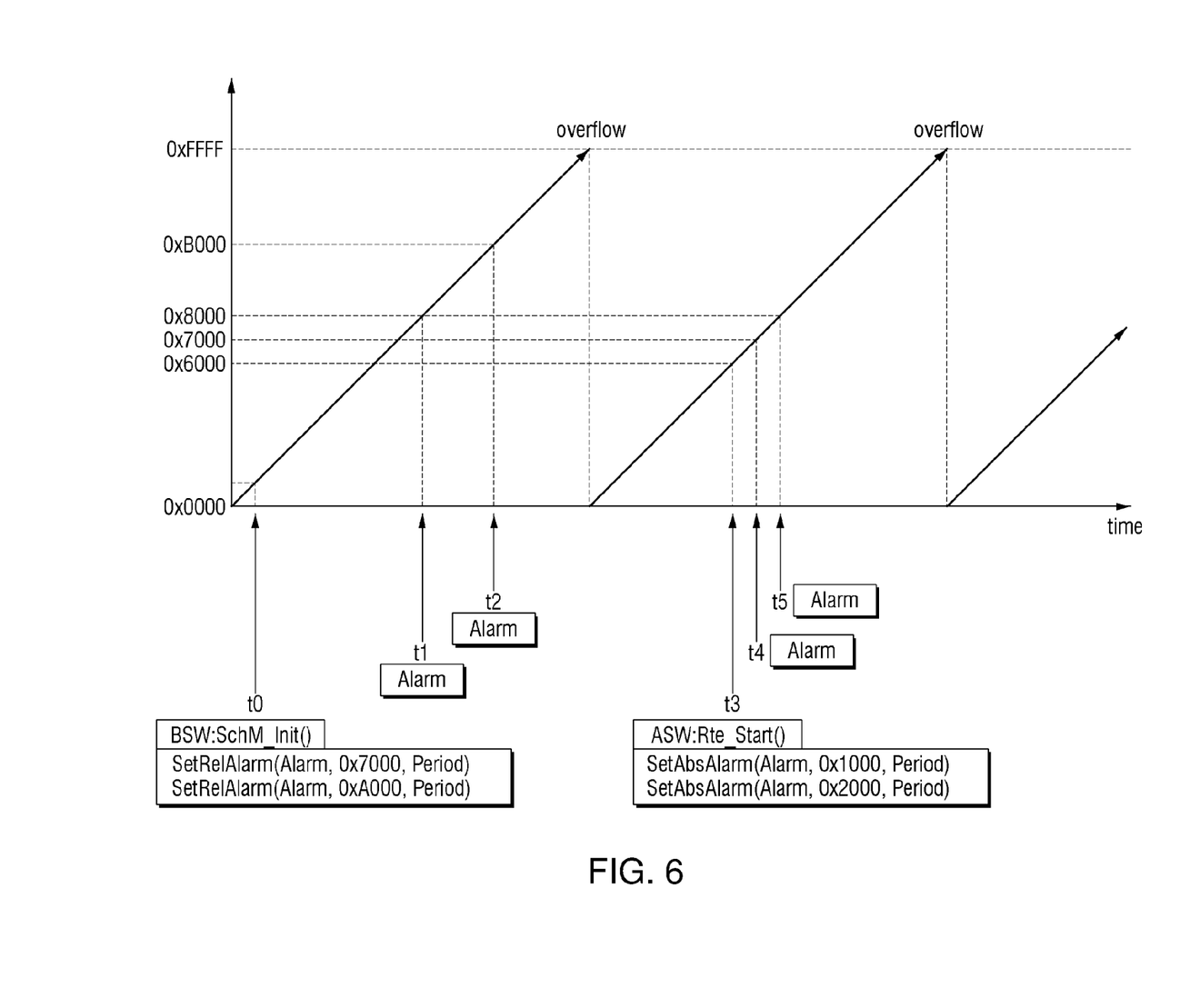

FIGS. 5 and 6 are diagrams for explaining problems of task distribution by the conventional absolute method and the conventional relative method. FIG. 5 is a diagram for explaining the absolute method, and FIG. 6 is a diagram for explaining the relative method.

Referring to FIG. 5, the SchM_Init( ) function for the BSW module is called at a time t0 of 1 ms corresponding to 0x1000, and the Rte_Start( ) function for the ASW module is called at time t3 of 22 ms corresponding to 1 Cycle+0x6000. In each of the SchM_Init( ) and Rte_Start( ) functions, two alarms are set by the SetAbsAlarm function.

In the case of the SchM_Init( ) function, two alarms are set in the SchM_Init( ) function by SetAbsAlarm (Alarm, 0x7000, Period) and SetAbsAlarm (Alarm, 0xA000, Period). In the absolute method, the time when the SchM_Init( ) function is called does not affect the time when an alarm is generated. Therefore, only the 0x7000 value and the 0xA000 value received as offset parameters determine the time when the alarm is generated.

That is, if offset values are distributed, alarms are generated in a distributed manner, and if the alarms are generated in a distributed manner, tasks are also executed in a distributed manner. Specifically, an alarm is generated at a time t1 of 7 ms determined by an offset value of 0x7000, and another alarm is generated at time t2 of 10 ms determined by an offset value of 0xA000. In addition, the two alarms may be repeatedly generated in each cycle in addition to the time t1 and the time t2.

Although not illustrated in FIG. 5, if the two alarms set in the SchM_Init( ) function are repeated in each cycle, an alarm for the BSW module may be generated and a BSW task may be executed at each time of n*16 ms+7 ms corresponding to n*Cycle+0x7000 and at each time of n*16 ms+10 ms corresponding to n*Cycle+0xA000. Therefore, an alarm for the ASW module needs to be generated at other times by setting the offset parameter to values other than 0x7000 and 0xA000. Only then can tasks be distributed.

In the case of the Rte_Start( ) function, two alarms are set in the Rte_Start( ) function by SetAbsAlarm (Alarm, 0x1000, Period) and SetAbsAlarm (Alarm, 0x2000, Period). Since the absolute method is used and a value of 0x1000 and a value of 0x2000 are used as offset parameters, tasks of the BSW module and tasks of the ASW module are well distributed.

That is, since the time when an alarm is generated is determined only by an offset in the absolute method, tasks can be distributed by simply setting different offset values. However, in the absolute method, the time when an alarm is generated may be different from a predicted time depending on the time when the SchM_Init( ) function or the Rte_Start( ) function for setting an alarm is called and the offset value.

Referring to FIG. 5, the SchM_Init( ) function is called at a time t0 of 1 ms corresponding to 0 Cycle+0x1000, and offset parameters at that time are 0x7000 and 0xA000. Since the counter has a value of 0x1000 at the time when the function is called and the offset parameters are 0x7000 and 0xA000 greater than 0x1000, an alarm is generated when the value of the counter corresponds to 0x7000 and 0xA000 after the SchM_Init( ) function is called. However, the situation is a little different in the case of the Rte_Start( ) function.

Referring to FIG. 5, the Rte_Start( ) function is called at a time t3 of 22 ms corresponding to 1 Cycle+0x6000, and offset parameters at that time are 0x1000 and 0x2000. Since the counter has a value of 0x6000 at the time when the Rte_Start( ) function is called and the offset parameters are 0x1000 and 0x2000 smaller than 0x6000, an overflow occurs after the Rte_Start( ) function is called. Therefore, the value of the counter is initialized, and an alarm is generated when the value of the counter corresponds to 0x1000 and 0x2000 again. That is, if the value of an offset parameter is smaller than the value of the counter at the time when a function is called, an alarm can be generated after one more cycle.

In other words, the time when the Rte_Start( ) function is called is a time corresponding to 1 cycle+0x6000, but an alarm is actually generated in 2 Cycle instead of 1 Cycle. That is, an alarm is generated at a time t4 of 33 ms corresponding to 2 Cycle+0x1000 and at a time t5 of 34 ms corresponding to 2 Cycle+0x2000.

In the absolute method, alarms can be distributed by simply distributing offset values, and tasks can be distributed as a result of the distribution of the alarms. However, if an offset value is smaller than a counter value at a time when a function is called, one more cycle is required for an alarm to be generated. That is, the start time of the alarm may be delayed.

In other words, even if a function is called, it is difficult to accurately predict whether an alarm will be generated in a current cycle or in a next cycle. This is because the absolute method does not take into account the counter value at a time when a function is called. Thus, in the absolute method, it is possible to efficiently distribute tasks but difficult to accurately manage the tasks.

Referring to FIG. 6, as in FIG. 5, the SchM_Init( ) function for the BSW module is called at a time t0 of 1 ms corresponding to 0x1000, and the Rte_Start( ) function for the ASW module is called at a time t3 of 22 ms corresponding to 1 Cycle+0x6000. However, in FIG. 6, unlike in FIG. 5, two alarms are set in each of the SchM_Init( ) and Rte_Start( ) functions by the SetRelAlarm function.

In the case of the SchM_Init( ) function, two alarms are set in the SchM_Init( ) function by SetRelAlarm (Alarm, 0x7000, Period) and SetRelAlarm (Alarm, 0xA000, Period). In the relative method, since the time when the SchM_Init( ) function is called affects the time when an alarm is generated, the time when the alarm is generated is determined by the value of 0x1000 corresponding to the time when the SchM_Init( ) function is called and the values of 0x7000 and 0xA000 received as offset parameters.

That is, in the relative method, distributing offset values is not enough, and the time when a function is called should also be taken into consideration. Specifically, an alarm is generated at a time t1 of 8 ms by the offset value of 0x7000 called at 0x1000, and another alarm is generated at a time of t2 of 11 ms by the offset value of 0xA000 called at 0x1000. In addition, the two alarms may be repeatedly generated in each cycle in addition to the times t1 and t2.

Although not illustrated in FIG. 6, if the two alarms set in the SchM_Init( ) function are repeated in each cycle, an alarm for the BSW module may be generated and a BSW task may be executed at each time of n*16 ms+8 ms corresponding to n*Cycle+0x8000 and at each time of n*16 ms+11 ms corresponding to n*Cycle+0xB000. Therefore, an alarm for the ASW module needs to be generated at other times by setting the time when the function is called and the offset parameter to values other than 0x8000 and 0xB000. Only then can tasks be distributed.

In the case of the Rte_Start( ) function, two alarms are set in the Rte_Start( ) function by SetRelAlarm (Alarm, 0x1000, Period) and SetRelAlarm (Alarm, 0x2000, Period). Since the relative method is used and a value of 0x1000 and a value of 0x2000 are used as offset parameters, the offset parameters are well distributed. However, in the relative method, tasks cannot be distributed by simply distributing the offset parameters.

Referring to FIG. 6, the Rte_Start( ) function is called at a time t3 of 22 ms corresponding to 1 Cycle+0x6000, and 0x1000 and 0x2000 are received as offset parameters at that time. Since the counter has a value of 0x6000 at the time when the function is called and the offset parameters are 0x1000 and 0x2000, an alarm is generated, after the Rte_Start( ) function is called, at a time corresponding to 1 Cycle+0x6000+0x1000, that is, at a time t4 of 23 ms corresponding to 1 Cycle+0x7000 and is generated at a time corresponding to 1 Cycle+0x6000+0x2000, that is, at a time t5 of 24 ms corresponding to 1 Cycle+0x8000. That is, the value of the counter at a time when a function is called and the value of an offset parameter determine the time when an alarm is generated. Therefore, even if offset parameters are distributed, alarms may not be distributed depending on the time when a function is called.

That is, even if offset parameters are distributed like 0x7000 and 0xA000 in the SchM_Init( ) function and like 0x1000 and 0x20000 in the Rte_Start( ) function, an alarm is generated at 0x8000 and 0xB000 in the SchM_Init( ) function because the time when the SchM_Init( ) function was called is 0x1000, and an alarm is generated at 0x7000 and 0x8000 in the Rte_Start( ) function because the time when the Rte_Start( ) function was called is 0x6000. Therefore, the alarms are concentrated at 0x8000.

In the relative method, an alarm is generated after a period of time corresponding to an offset value elapses after a function is called. Therefore, the time when an alarm will be generated can be accurately predicted. That is, the start time of the alarm is not delayed. However, it is not possible to distribute alarms by simply distributing offset values, and the time when a function for setting an alarm is called should also be taken into account to distribute tasks.

In other words, when a function for setting an alarm is called, both the time when the function was called and an offset parameter should be taken into account to distribute tasks. This is because the alarm for the BSW module is set by the SchM_Init( ) function, and the alarm for the ASW module is set by the Rte_Start( ) function. That is, it is difficult to appropriately distribute tasks using the relative method because an alarm is set at a different time according to a module in the AUTOSAR operating system. Thus, in the relative method, it is possible to accurately manage tasks but difficult to efficiently distribute the tasks.

Until now, the disadvantages of the absolute method and the relative method in the operation structure of the AUTOSAR software which is linked to one counter and required to initialize and start OsAlarm at different times have been described with reference to FIGS. 5 and 6. The disadvantages can be summarized in tables as in FIG. 7A and FIG. 7B.

Figure 7A:
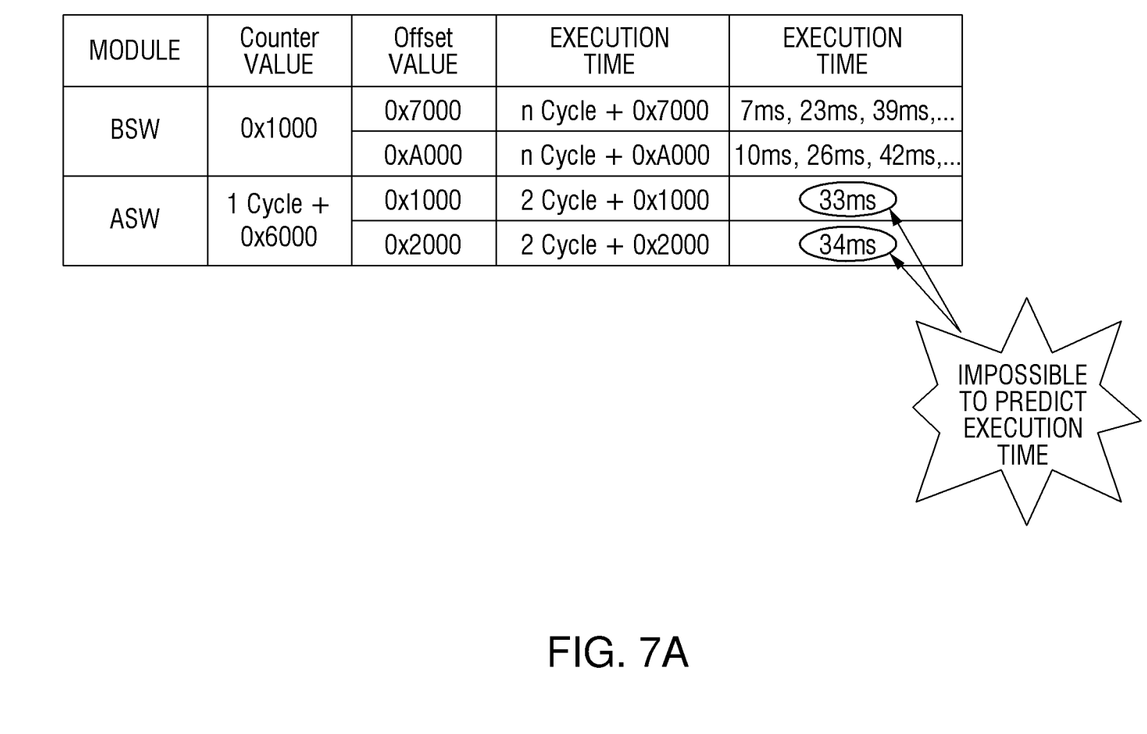
FIGS. 7A and 7B are tables for explaining problems of task distribution by the conventional absolute method and the conventional relational method.
Figure 7B:
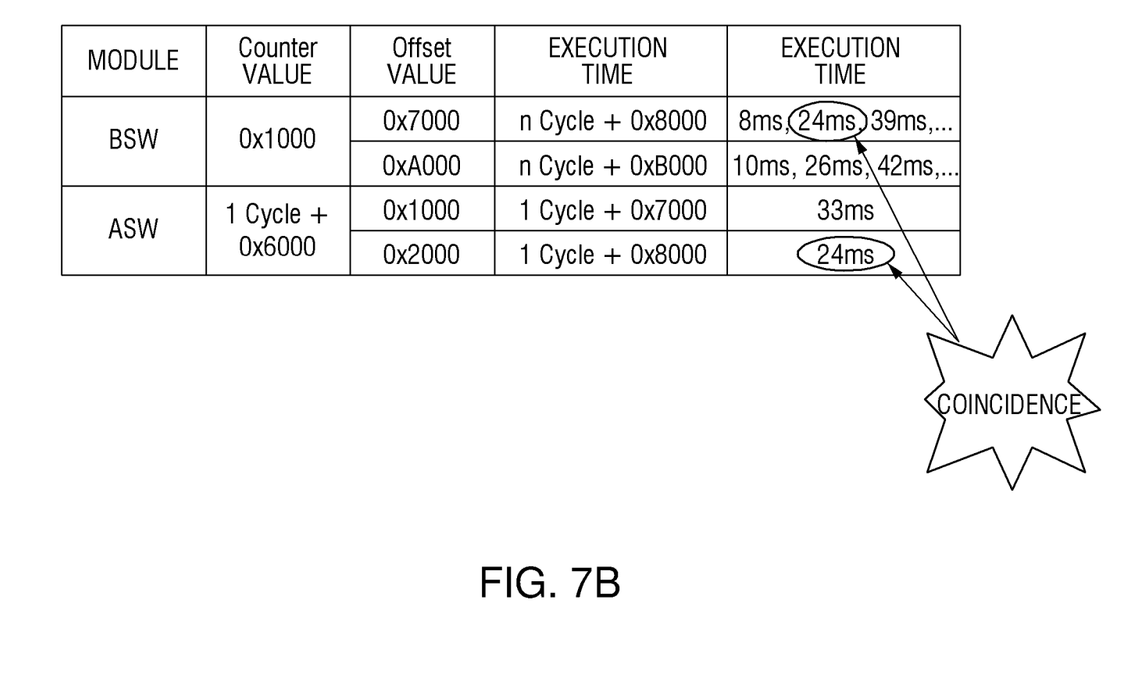

FIGS. 7A and 7B are tables for explaining problems of task distribution by the conventional absolute method and the conventional relational method.

FIG. 7A is a table summarizing the case of FIG. 5, and FIG. 7B is a table summarizing the case of FIG. 6. Referring to FIG. 7A, the SchM_Init( ) function for the BSW module is called when the counter is 0x1000. At this time, 0x7000 and 0xA000 are received as offset parameters. For ease of understanding, it is assumed that the BSW module repeatedly calls a BSW task every cycle and that the ASW module calls an ASW task only once.

In the absolute method, the time when an alarm is generated is determined by an offset value. Therefore, an alarm is generated and a task is executed at each time corresponding to n Cycle+0x7000 in the case of an offset of 0x7000 and at each time corresponding to n Cycle+0xA000 in the case of an offset of 0xA000. That is, in the case of 0x7000, a task will be executed at 7 ms, 16 ms+7 ms=23 ms, 2×16 ms+7 ms=39 ms, . . . . In the case of 0xA000, a task will be executed at 10 ms, 16 ms+10 ms=26 ms, 2×16 ms+10 ms=42 ms, . . . .

Similarly, the Rte_Start( ) function for the ASW module is called when the counter is 1 Cycle+0x6000. At this time, 0x1000 and 0x2000 are received as offset parameters. Since the offset parameters are smaller than 0x6000 which is the value of the counter at the time the function was called, an alarm is generated only after the counter overflows once. That is, an alarm is generated at a time of 33 ms corresponding to 2 Cycle+0x1000 and a time of 34 ms corresponding to 2 Cycle+0x2000.

Since the time when an alarm is generated is determined by an offset value in the absolute method, tasks for the BSW module and the ASW module can be distributed by simply setting different offset values. In FIG. 7A, since offset values are different like 0x7000, 0xA000, 0x1000 and 0x2000, the times when tasks are executed do not coincide with each other. However, in the case of the ASW module, since the offset values are smaller than 0x6000 which is the value of the counter at the time when the function was called, the start of the alarm is delayed.

That is, in the absolute method, it is difficult to accurately predict the time when a task will be executed. In the absolute method, it is easy to distribute tasks but difficult to manage the tasks. In the case of the ASW module, although the function was called at 1 Cycle+0x6000, a task is executed in 2 Cycle. Therefore, there is a delay until the execution of OsTask, and it is difficult to predict the actual task execution time accurately. This is because the absolute method does not consider the time when a function is called.

Likewise, referring to FIG. 7B, the SchM_Init( ) function for the BSW module is called when the counter is 0x1000. At this time, 0x7000 and 0xA000 are received as offset parameters. The relative method considers the time when a function is called as well as an offset parameter when determining the time when an alarm is generated. Therefore, an alarm is generated and a task is executed at each time corresponding to n Cycle+(0x1000+0x7000) in the case of an offset of 0x7000 and at each time corresponding to n Cycle+(0x1000+0xA000) in the case of an offset of 0xA000. That is, in the case of 0x7000, a task will be executed at 1 ms+7 ms=8 ms, 16 ms+1 ms+7 ms=24 ms, 2×16 ms+1 ms+7 ms=40 ms, . . . . In the case of 0xA000, a task will be executed at 1 ms+10 ms=11 ms, 16 ms+1 ms+10 ms=27 ms, 2*16 ms+1 ms+10 ms=43 ms, . . . .

Similarly, the Rte_Start( ) function for the ASW module is called when the counter is 1 cycle+0x6000. At this time, 0x1000 and 0x2000 are received as offset parameters. Since an alarm is generated after a period of time corresponding to an offset value elapses after the function is called, the alarm is generated at a time of 23 ms corresponding to 1 Cycle+ 0x6000+0x1000 and at a time of 24 ms corresponding to 1 Cycle+0x6000+0x2000.

In the relative method, an alarm is generated after a period of time corresponding to an offset value elapses after a function is called. Therefore, there is no delay in the alarm. That is, the time when the alarm will be generated can be accurately predicted. However, since the alarm is generated in consideration of the time when the function was called and the offset value, it is difficult to distribute alarm generation times.

That is, it is difficult to distribute tasks in the relative method. In the relative method, it is easy to manage tasks but difficult to distribute the tasks. For example, although the offset parameters 0x7000 and 0xA000 of the BSW module are different from the offset parameters 0x1000 and 0x2000 of the ASW module, it can be seen that alarm generation is concentrated at a time of 24 ms because the times when the function for the BSW module and the function for the ASW module were called are 0x1000 and 1 Cycle+0x6000, respectively. As a result, resources cannot be used efficiently.

Until now, problems that can occur when tasks for the BSW module and the ASW module are managed using the conventional absolute method and the conventional relative method have been described. These problems arise because the time for setting an alarm for the BSW module is different from the time for setting an alarm for the ASW module. That is, while the AUTOSAR operating system tries to avoid the interference between OsTasks by applying appropriate offsets, it is difficult to distribute tasks and, at the same time, efficiently manage the tasks using any of the absolute method and the relative method.

In this regard, there is a need for a method of distributing and efficiently managing tasks even if OsAlarm is initialized and started at different times for the BSW module and the ASW module. To this end, a new method that combines the advantages of the absolute method and the relative method is required. In an embodiment of the inventive concept, a new method named 'adaptive relative OsAlarm' is proposed.

The adaptive relative method proposed in the inventive concept is to store a counter value used by the BSW module at a time when the SchM_Init( ) function is called and correct an offset of an alarm set by the Rte_Start( ) function by comparing a counter value stored at a time when the Rte_Start( ) function is called with a current counter value. Thus, even if the BSW module and the ASW module are called at different times, it is possible to apply an offset synchronized with one time domain by sharing the counter value at the time when the BSW module is called.

Figure 8:
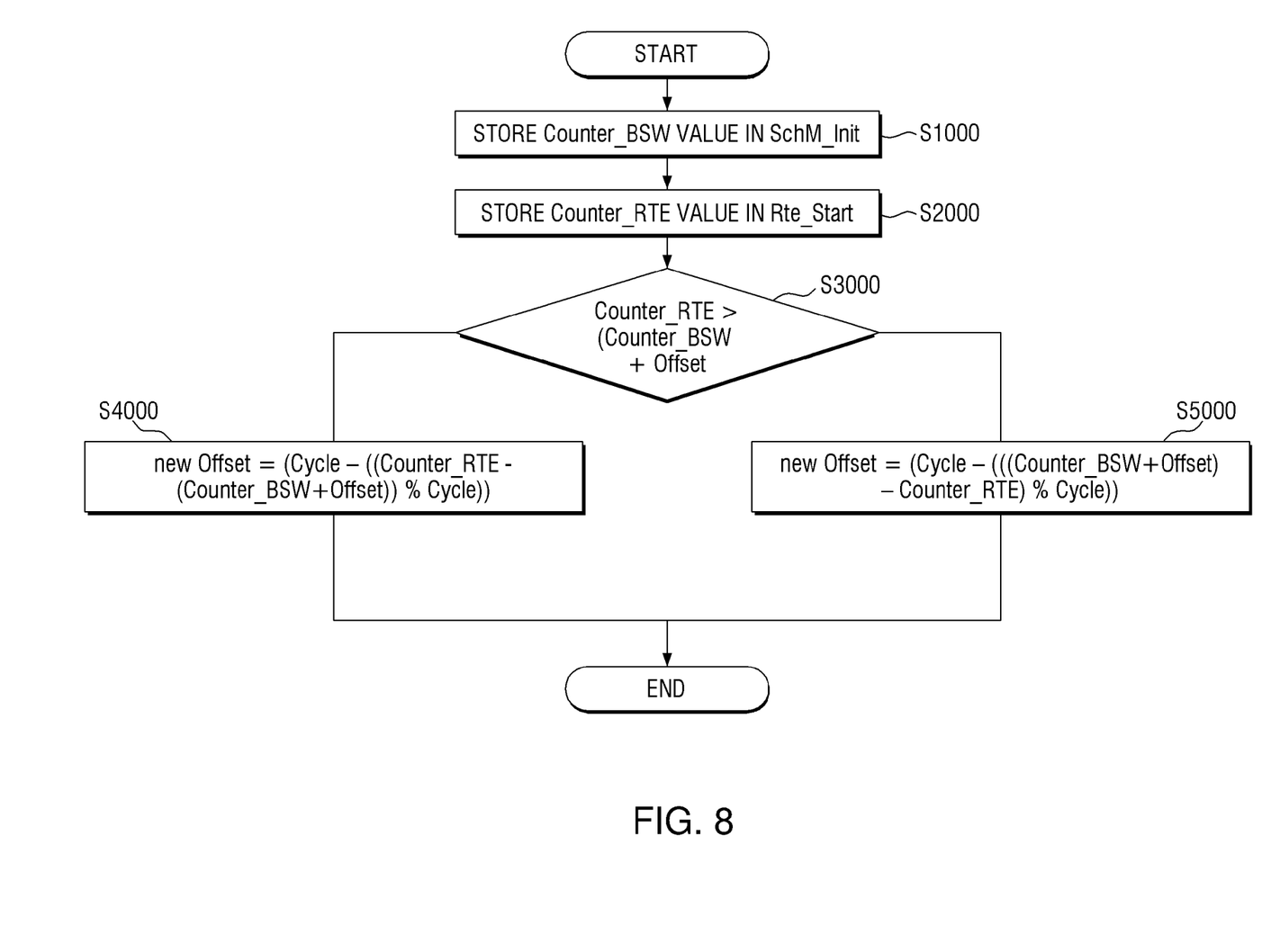
FIG. 8 is a flowchart illustrating a method of managing tasks using an adaptive relative method according to an embodiment.

FIG. 8 is a flowchart illustrating a method of managing tasks using an adaptive relative method according to an embodiment.

Referring to FIG. 8, the value of a counter at a time when an alarm of a BSW module is set, that is, at a time when a SchM_Init( ) function is called, is stored in a variable called 'Counter_BSW' (operation S1000). In the case of the BSW module, the time when an alarm will be generated is set according to the conventional relative method without offset correction.

The value of the counter at a time when an alarm of the ASW module is set, that is, at a time when an Rte_Start( ) function is called, is stored in a variable called 'Counter_RTE' (operation S2000). In case of the ASW module, an offset is not used as it is but is corrected in view of the time when the alarm of the BSW module was set.

To this end, a value of Counter_RTE is compared with a value of (Counter_BSW+an offset value of the Rte_Start( ) function for the ASW module) (operation S3000). If the offset value of the Rte_Start( ) function for the ASW module is corrected by comparing the two values, the BSW module and the ASW module may generate alarms in one time domain. That is, although the relative method is used, an effect similar to the effect of the absolute method can be achieved.

If the value of Counter_RTE is greater than the value of (Counter_BSW+Offset), Cycle−((Counter_RTE−(Counter_BSW+Offset)) % Cycle) may be used as a new offset value (operation S4000). As apparent from the formula, a new offset is determined by correcting the offset in view of the value of Counter_RTE and the value of Counter_BSW. Therefore, even if the alarm for the BSW module and the alarm for the ASW module are set at different times, relative alarms can be set in a way similar to the absolute method.

Conversely, if the value of Counter_RTE is smaller than the value of (Counter_BSW+Offset), Cycle−(((Counter_BSW+Offset)−Counter_RTE) % Cycle) may be used as a new offset value (operation S5000). If operations S4000 and S5000 are compared, it can be seen that a new offset is determined by correcting the offset based on an absolute value of a difference between the value of Counter_RTE and the value of (Counter_BSW+Offset).

The method of distributing tasks using the adaptive relative method through offset correction according to the embodiment can be understood more clearly when applied to the case of FIG. 7B. How execution times are changed by a corrected offset and how the load is distributed will be described below.

Figure 9:
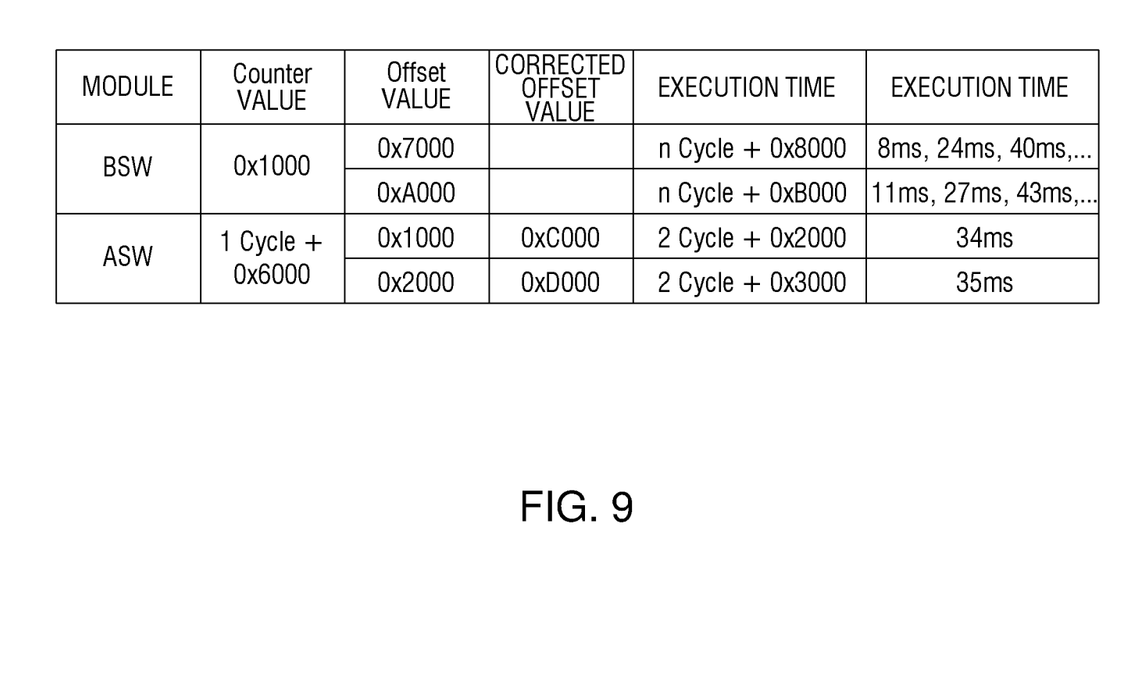
FIG. 9 is a table for explaining a method of managing tasks using the adaptive relative method according to an embodiment.

FIG. 9 is a table for explaining a method of managing tasks using an adaptive relative method according to an embodiment.

Referring to FIG. 9, the table of FIG. 9 is the same as the table of FIG. 7B up to an initial counter value and an offset value. However, an item called 'corrected offset value' is added to the table of FIG. 9. This shows that advantages of the absolute method are absorbed while the relative method is used.

Specifically, the process of setting an alarm for the BSW module is not much different from that of FIG. 7B. In FIG. 9, as in FIG. 7B, an alarm is generated at a time (8 ms, 24 ms, 40 ms, . . . ) corresponding to n Cycle+0x8000 and at a time (11 ms, 27 ms, 43 ms . . . ) corresponding to n Cycle+0xB000. That is, the process of setting the alarm for the BSW module is the same in FIGS. 9 and 7B. In FIG. 9A, however, the time when the SchM_Init 0 function for setting the BSW module was called is stored separately in a variable. In the example of FIG. 9, the counter value of 0x1000 is separately stored in a variable named 'Counter_BSW' and then used when a function for the ASW module is called.

As for the process of setting an alarm for the ASW module, the Rte_Start( ) function was called at a time of 1 Cycle+0x6000 as in FIG. 7B. Here, an offset of an alarm to be set by the Rte_Start( ) function is changed with reference to the value 0x1000 of Counter_BSW at the time when the SchM_Init( ) function was called. To this end, the counter value of 0x6000 at the time the Rte_Start( ) function was called is stored in a Counter_RTE variable.

Next, the value of Counter_RTE is compared with the value of (Counter_BSW+offset). In case of an offset of 0x1000, the value of Counter_RTE is 0x6000, and the value of (Counter_BSW+offset) is 0x1000+0x1000=0x2000. That is, since the value of Counter_RTE is greater than the value of (Counter_BSW+offset), if a difference of 0x4000 between the two values is subtracted from one cycle of 0xFFFF, a new offset value of 0xC000 can be obtained. That is, the offset value of 0x1000 is corrected to the value of 0xC000. In the same way, an offset value of 0x2000 is corrected to a value of 0xD000.

If the corrected offset values are added to the counter value of (1Cycle+0x6000) at the time when the Rte_Start( ) function was called, it can be calculated that the alarm for the ASW module will be generated at 34 ms corresponding to 2 Cycle+0x2000 and at 35 ms corresponding to 2 Cycle+0x3000.

Compared with the case of FIG. 7B, the alarm for the ASW module is generated at different times from the alarm for the BSW module. Although the SchM_Init( ) function for the BSW module and the Rte_Start( ) function for the ASW module are executed at different times, it can be seen that task execution times corresponding to 0x7000, 0xA000, 0x1000 and 0x2000 are determined to be 0x8000, 0xB000, 0x2000 and 0x3000 as if the relative method were applied based on the counter value of 0x1000 at the time when the SchM_Init( ) function for the BSW module was executed.

If tasks are set based on one time domain using the relative method as described above, it is possible to accurately predict the times when the tasks will be executed, and at the same time, efficiently utilize resources by distributing the task execution times. This is an adaptive relative alarm setting method proposed in an embodiment of the inventive concept.

According to the inventive concept, resources can be efficiently distributed even in the operation structure of AUTOSAR software which is linked to one counter and required to initialize and start OsAlarm at different times. In addition, the start time of a task can be accurately predicted.

However, the effects of the inventive concept are not restricted to the one set forth herein. The above and other effects of the inventive concept will become more apparent to one of daily skill in the art to which the inventive concept pertains by referencing the claims.

While the inventive concept has been particularly illustrated and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

What is claimed is:

1. A method of distributing tasks of an AUTomotive Open System Architecture (AUTOSAR) operating system and managing OsTask using OsAlarm in the AUTOSAR operating system, the method comprising:
   storing in Counter_BSW a value of a counter at a time when a function for setting an alarm for a basic software (BSW) module is called;
   storing in Counter_RTE the value of the counter at a time when a function for setting an alarm for an application software (ASW) module is called; and
   correcting an offset value of the alarm for the ASW module using a value of Counter_BSW and a value of Counter_RTE.

2. The method of claim 1, wherein the function for setting the alarm for the BSW module is a SchM_Init function, the function for setting the alarm for the ASW module is an Rte_Start function, and the SchM_Init function is executed before the Rte_Start function.

3. The method of claim 1, wherein the correcting of the offset value comprises:
   comparing the value of Counter_RTE with a value of (Counter_BSW+Offset); and
   setting a new offset when the value of Counter_RTE is greater than the value of (Counter_BSW+Offset),
   wherein the new offset is set by
   new Offset=(Cycle−((Counter_RTE−(Counter_BSW+Offset)) % Cycle)), where Cycle is a cycle of the counter.

4. The method of claim 1, wherein the correcting of the offset value comprises:
   comparing the value of Counter_RTE with a value of (Counter_BSW+Offset); and
   setting a new offset when the value of Counter_RTE is smaller than the value of (Counter_BSW+Offset),
   wherein the new offset is set by
   new Offset=(Cycle−(((Counter_BSW+Offset)−Counter_RTE) % Cycle)), where Cycle is a cycle of the counter.

5. An apparatus for distributing tasks of an AUTOSAR operating system and managing OsTask using OsAlarm in the AUTOSAR operating system, the apparatus comprising:
   a Counter_BSW storage unit which stores in Counter_BSW a value of a counter at a time when a function for setting an alarm for a BSW module is called;
   a Counter_RTE storage unit which stores in Counter_RTE the value of the counter at a time when a function for setting an alarm for an ASW module is called; and
   an Offset correction unit which corrects an offset value of the alarm for the ASW module using a value of Counter_BSW and a value of Counter_RTE.

6. A method of correcting an alarm offset when setting two or more alarms using a counter in an embedded operating system, the method comprising:
   storing in a first variable a value of the counter at a time when a function for setting a first alarm for a basic software (BSW) module is called;
   storing in a second variable a value of the counter at a time when a function for setting a second alarm for an application software (ASW) module is called; and
   correcting an offset value of the second alarm using a value of the first variable and a value of the second variable.

7. The method of claim 6, wherein the correcting of the offset value of the second alarm comprises:
   comparing the value of the second variable with (the value of the first variable+the offset value); and
   setting a new offset when the value of the second variable is greater than (the value of the first variable+the offset value), wherein the new offset is set by new offset=(counter cycle−(value of the second variable−(value of the first variable)+offset value)) % counter cycle)).

8. The method of claim 6, wherein the correcting of the offset value of the second alarm comprises:
   comparing the value of the second variable with (the value of the first variable+the offset value); and
   setting a new offset when the value of the second variable is smaller than (the value of the first variable+the offset value), wherein the new offset is set by
   new offset=(counter cycle−(((value of the first variable+offset value)−value of the second variable) % counter cycle)).

* * * * *